United States Patent
Buck et al.

(10) Patent No.: US 8,141,012 B2
(45) Date of Patent: Mar. 20, 2012

(54) TIMING CLOSURE ON MULTIPLE SELECTIVE CORNERS IN A SINGLE STATISTICAL TIMING RUN

(75) Inventors: Nathan C. Buck, Essex Junction, VT (US); Brian M. Dreibelbis, Essex Junction, VT (US); John P. Dubuque, Essex Junction, VT (US); Eric A. Foreman, Essex Junction, VT (US); Peter A. Habitz, Essex Junction, VT (US); Jeffrey G. Hemmett, Essex Junction, VT (US); Susan K. Lichtensteiger, Essex Junction, VT (US); Natesan Venkateswaran, Hopewell Junction, NY (US); Chandramouli Visweswariah, Hopewell Junction, NY (US); Xiaoyue Wang, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 12/549,061

(22) Filed: Aug. 27, 2009

(65) Prior Publication Data

US 2011/0055793 A1 Mar. 3, 2011

(51) Int. Cl.
*G06F 17/50* (2006.01)
(52) U.S. Cl. .................. 716/104; 716/113; 716/132
(58) Field of Classification Search .............. 716/104, 716/113, 132
See application file for complete search history.

(56) References Cited

U.S. PATENT DOCUMENTS

| | | | |
|---|---|---|---|
| 7,475,366 B2 | 1/2009 | Kuemerle et al. | |
| 7,796,757 B2 * | 9/2010 | McClenny et al. | ........... 380/239 |
| 2008/0209372 A1 | 8/2008 | Buck et al. | |
| 2008/0209374 A1 | 8/2008 | Buck et al. | |
| 2008/0209375 A1 | 8/2008 | Buck et al. | |

* cited by examiner

*Primary Examiner* — Thuan Do
(74) *Attorney, Agent, or Firm* — Ryan K. Simmons; Hoffman Warnick LLC

(57) ABSTRACT

An approach for covering multiple selective timing corners in a single statistical timing run is described. In one embodiment, a single statistical timing analysis is run on the full parameter space that covers unlimited process parameters/environment conditions. Results from the statistical timing analysis are projected for selected corners. Timing closure is performed on the corners having the worst slacks.

22 Claims, 4 Drawing Sheets

TIMING CLOSURE ON MULTIPLE SELECTIVE CORNERS IN A SINGLE STATISTICAL TIMING RUN

BACKGROUND

This invention relates generally to statistical timing analysis of integrated circuits, and more particularly to timing closure on multiple selective corners in a single statistical timing run of an integrated circuit design.

Timing analysis is used to verify integrated circuit designs and analyze circuit performance. Timing of integrated circuits may vary due to the effects of environmental and process variation. Example sources of variation include, but are not limited to, voltage, metal thickness, temperature, transistor channel length, transistor threshold voltage, gate oxide thickness and other process controlled performance changing parameters. The traditional timing methodology that has been used to handle such variability in an integrated circuit includes conducting multiple static timing analyses at different "cases" or "corners" to determine the spread of performance of the circuit under these variations. A corner refers to a set of process parameters/environment conditions (hereinafter "parameters") that cause variations in the static timing analysis of an integrated circuit. Corners may include, for example, a "best case" corner that provides the fastest path delay between two particular nodes in a circuit path or "worst case" corner that provides the slowest path delay between two particular nodes in a circuit path. Bounding the timing for each possible corner will lead to an unmanageable number of timing runs (i.e., $2^N$ set of runs for N parameters that can take on two values) because of the numerous independent and significant sources of variation. This unmanageable number of timing runs makes it difficult to get timing closure on an integrated circuit design.

Several approaches have been implemented to perform such multiple-corner static timing analyses. One approach that has been implemented to perform a multiple-corner static timing analysis includes performing multiple discrete timing runs in one or more computers and merging the multiple single timing results. Because there are so many parameters it is still difficult to obtain timing closure despite the use of one or more computers. Another approach includes using a Variation-Aware Timing (VAT) methodology that uses a reduced set of timing runs to perform a multiple-corner timing analysis in the presence of parameter variation. For example, hundreds of traditional, discrete timing runs that would have been previously required to account for all parameter variations can be reduced to only four timing runs for a typical application specific integrated circuit (ASIC) by using the VAT methodology. However, the VAT methodology still does not provide full chip coverage even though all timing corners are analyzed as it suffers from a trade-off between run-time and more path coverage due to its path-based inherence.

In light of the issues associated with a corner static timing analysis performed on one or more computers and the VAT methodology, a statistical timing analysis has been used as a way to accurately account for device, interconnect and process and environment variations. Statistical timing reduces the excessive number of analysis runs required for timing closure and minimizes pessimism (i.e., requiring additional margin for a signal to become stable earlier or remain stable later than would be required against another signal or absolute time) compared to the above-noted techniques. During statistical timing analysis, timing quantities such as delays, arrival times and slacks are not treated as single numbers, but rather as probability distributions. Thus, the full probability distribution of the performance of the integrated circuit under the influence of variations is predicted by a single timing run. As a result, this methodology can guarantee integrated circuit timing across the full parameter space including all corners, even non-physical corners.

As parameter control has become more and more difficult, timing closure over the full parameter distribution has become quite challenging. Because doing timing analysis on an integrated circuit chip is not the same as performing timing closure on the integrated circuit. Determining timing slacks in the full parameter space does not mean that the slacks need to be fixed in the full parameter space. A chip can achieve required performance under different conditions. For example, in a Process-Voltage-Temperature (PVT) space, an integrated circuit chip fabricated at the "fast" end of a process distribution may achieve required performance at one fixed temperature and voltage corner, while a chip fabricated at the "slow" end of a process distribution may achieve required performance at another fixed temperature and voltage corner. So, manufactured integrated circuit chips can be sorted into different bins based on whether they were fabricated at either the "slow" end or the "fast" end of a process distribution. Then an optimal temperature and voltage supply for operating the chips in each bin is determined. Based on that technique, it is appropriate to close integrated circuit chip timing only on a subset of the full parameter space.

SUMMARY

In one embodiment, there is a method performed on a computer system that performs a timing closure of a digital integrated circuit design on multiple selective corners in a single timing run that covers a full parameter space. In this embodiment, the method comprises using the computer system to perform the following: identifying the full parameter space for performing a statistical timing analysis of all circuit paths of the digital integrated circuit design, wherein the full parameter space is defined by parameters $P_1, P_2, \ldots, P_n$, wherein $P_n \in (\min_n, \max_n)$; identifying all corners of the parameters that model variation in a static timing analysis of the digital integrated circuit design; performing the statistical timing analysis for all of the circuit paths of the digital integrated circuit design across the full parameter space; selecting a subset of k corners for each circuit path from the parameters $P_1, P_2, \ldots, P_j$, wherein $j \in (1, n)$, wherein the selected subset of k corners are arranged as: $C1(P1=p_1^1, P2=p_2^1, \ldots, Pj=p_j^1)$, $C2(P1=p_1^2, P2=p_2^2, \ldots, Pj=p_j^2) \ldots Ck(P1=p_1^k, P2=p_2^k, \ldots, Pj=p_j^k)$; projecting timing results to a deterministic value using a distribution input from the statistical timing analysis at each of the selected subset of k corners of parameters $P_1, P_2, \ldots, P_j$ plus the sub-space of the remaining parameters $P_{j+1}, P_{j+2}, \ldots, P_n$ for each circuit path; determining the worst slacks from the projected timing results for the selected subset of k corners of parameters $P_1, P_2, \ldots, P_j$ plus sub-space of the remaining parameters $P_{j+1}, P_{j+2}, \ldots, P_n$; and closing the timing of the digital integrated circuit design on each circuit path according to the corners having the worst slacks.

In a second embodiment, there is a computer-readable medium storing computer instructions, which when executed, enables a computer system to perform a timing closure of a digital integrated circuit design on multiple selective corners in a single timing run that covers a full parameter space, the computer instructions causing the computer system to perform the following: identifying the full parameter space for performing a statistical timing analysis of all circuit paths of the digital integrated circuit design, wherein the full parameter space is defined by parameters $P_1, P_2, \ldots, P_n$, wherein $P_n \in (\min_n, \max_n)$; identifying all corners of the parameters that model variation in a static timing analysis of the digital integrated circuit design; performing the statistical timing analysis for all of the circuit paths of the digital integrated circuit design across the full parameter space; selecting a subset of k corners for each circuit path from the parameters $P_1, P_2, \ldots, P_j$, wherein $j \in (1, n)$, wherein the selected subset of k corners are arranged as: $C1(P1=p_1^1, P2=p_2^1, \ldots, Pj=p_j^1)$ $C2(P1=p_1^2, P2=p_2^2, \ldots, Pj=p_j^2) \ldots Ck(P1=p_1^k, P2=p_2^k, \ldots, Pj=p_j^k)$; projecting timing results to a deterministic value using a distribution input from the statistical timing analysis at each of the selected subset of k corners of parameters $P_1, P_2, \ldots, P_j$ plus the sub-space of the remaining parameters $P_{j+1}, P_{j+2}, \ldots, P_n$ for each circuit path; determining the worst slacks from the projected timing results for the selected subset of k corners of parameters $P_1, P_2, \ldots, P_j$ plus the sub-space of the remaining parameters $P_{j+1}, P_{j+2}, \ldots, P_n$; and closing the timing of the digital integrated circuit design on each circuit path according to the corners having the worst slacks.

In a third embodiment, there is a computer system for performing a timing closure of a digital integrated circuit design on multiple selective corners in a single timing run that covers a full parameter space. The computer system comprises at least one processing unit and memory operably associated with the at least one processing unit. A timing analysis tool storable in memory and executable by the at least one processing unit runs a single statistical timing analysis on the full parameter space covering the unlimited parameters and enables timing closure on any point associated with the unlimited parameters. The timing analysis tool comprises a parameter identification component that identifies the full parameter space for performing a statistical timing analysis of all circuit paths of the digital integrated circuit design, wherein the full parameter space is defined by parameters $P_1, P_2, \ldots, P_n$, wherein $P_n \in (\min_n, \max_n)$; a corner identification component that identifying all corners of the parameters that model variation in a static timing analysis of the digital integrated circuit design; a statistical timing analysis component that performs the statistical timing analysis for all of the circuit paths of the digital integrated circuit design across the full parameter space; a corner selection component that selects a subset of k corners for each circuit path from the parameters $P_1, P_2, \ldots, P_j$, wherein $j \in (1, n)$, wherein the selected subset of k corners are arranged as: $C1(P1=p_1^1, P2=p_2^1, \ldots, Pj=p_j^1)$ $C2(P1=p_1^2, P2=p_2^2, \ldots, Pj=p_j^2) \ldots Ck(P1=p_1^k, P2=p_2^k, \ldots, Pj=p_j^k)$; a projection component that projects timing results to a deterministic value using a distribution input from the statistical timing analysis at each of the selected subset of k corners of parameters $P_1, P_2, \ldots, P_j$ plus the sub-space of the remaining parameters $P_{j+1}, P_{j+2}, \ldots, P_n$ for each circuit path; a worst slack determining component that determines the worst slacks from the projected timing results for the selected subset of k corners of parameters $P_1, P_2, \ldots, P_j$ plus the sub-space of the remaining parameters $P_{j+1}, P_{j+2}, \ldots, P_n$; and a closure component that closes the timing of the digital integrated circuit design on each circuit path according to the corners having the worst slacks which are considered failing of timing sign-off criteria.

DETAILED DESCRIPTION

Embodiments of this invention are directed to addressing the issues associated with performing timing closure on an integrated circuit design for a full parameter space. In particular, embodiments of the invention perform a timing analysis for the full parameter space in all dimensions, but only close integrated circuit timing anywhere in a subset of the full parameter space. This results in reduced pessimism on timing closure while keeping full parameter space coverage and efficiency of run-time of timing closure.

Figure 1:
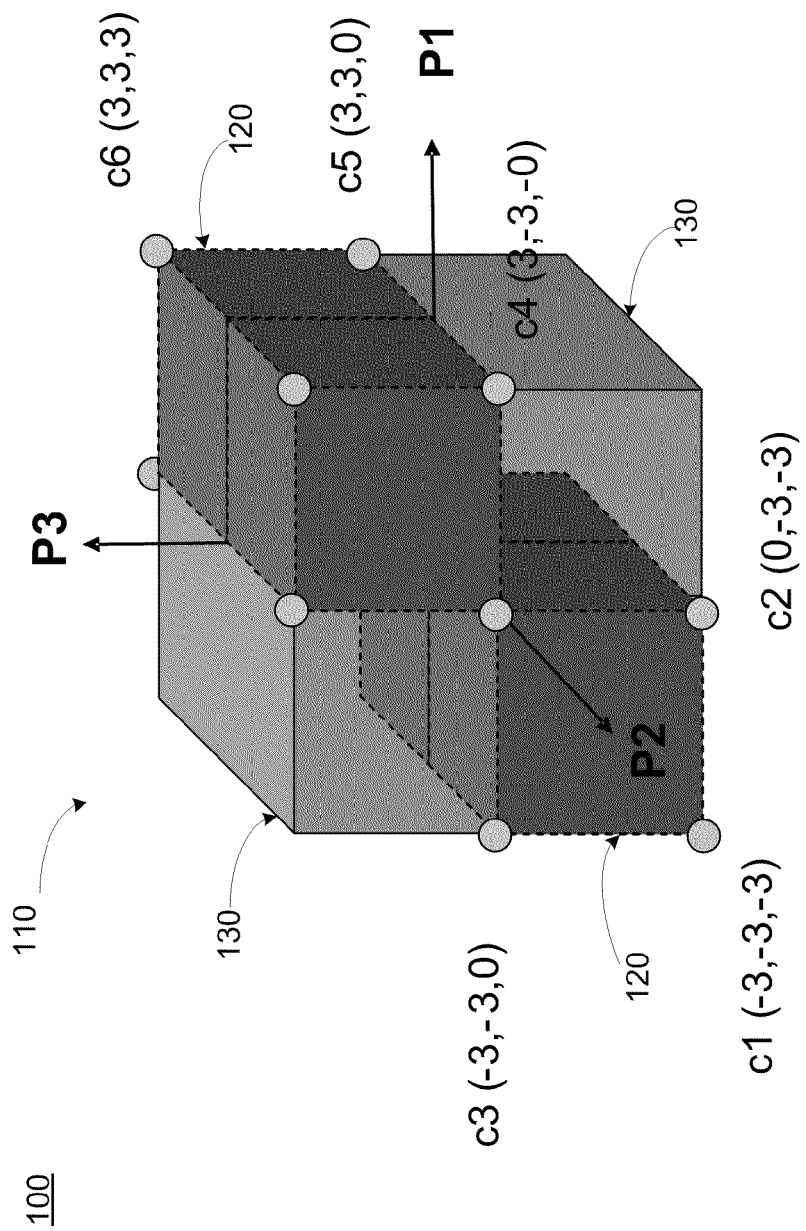
FIG. 1 illustrates an example of timing closure of a digital integrated circuit on a subset of a full parameter space.

FIG. 1 is an example 100 illustrating a need for a methodology that can address the issues associated with performing timing closure on an integrated circuit design for a full parameter space. In example 100 of FIG. 1, it is assumed that there are only three parameters P1, P2, P3, wherein each parameter value varies from −3 sigma to +3 sigma (i.e., wherein sigma represents standard deviation). This example is only for illustrating the principles of embodiments of the present invention and thus the amount of parameters is kept to a minimum. Those skilled in the art will recognize that a typical full parameter space for an integrated circuit design can have many parameters. Because in example 100 there only three parameters, the entire parameter space can be represented by a cube 110. In this example 100, it is desired to have the timing of the integrated circuit fall into two bins—one bin represented by boxes 120 and the second bin represented by boxes 130. If it is determined that it is only necessary to ensure that the integrated circuit will only fall into the bin represented by boxes 120, then integrated circuit timing is only necessary to be closed on the corners associated with boxes 120 and not the corners associated with boxes 130 (e.g., the integrated circuit manufactured in the determinated process is operated in the determinated environment). Closing timing on only selected corners is significantly less difficult than closing timing on all corners of the whole cube 100. In this example full corner coverage timing (closing on the corners associated with boxes 120 and 130) is overly pessimistic. Of course, it is necessary to cover the entire cube 110 in the timing analysis so that timing closure can be done in any selective corner, for instance the boxes 120 in this example. Therefore, it is desirable to have a methodology that can facilitate performing a timing analysis on the full parameter space in all dimensions for an integrated circuit, but only have timing closure anywhere in a subset of the full parameter space.

Figure 2:
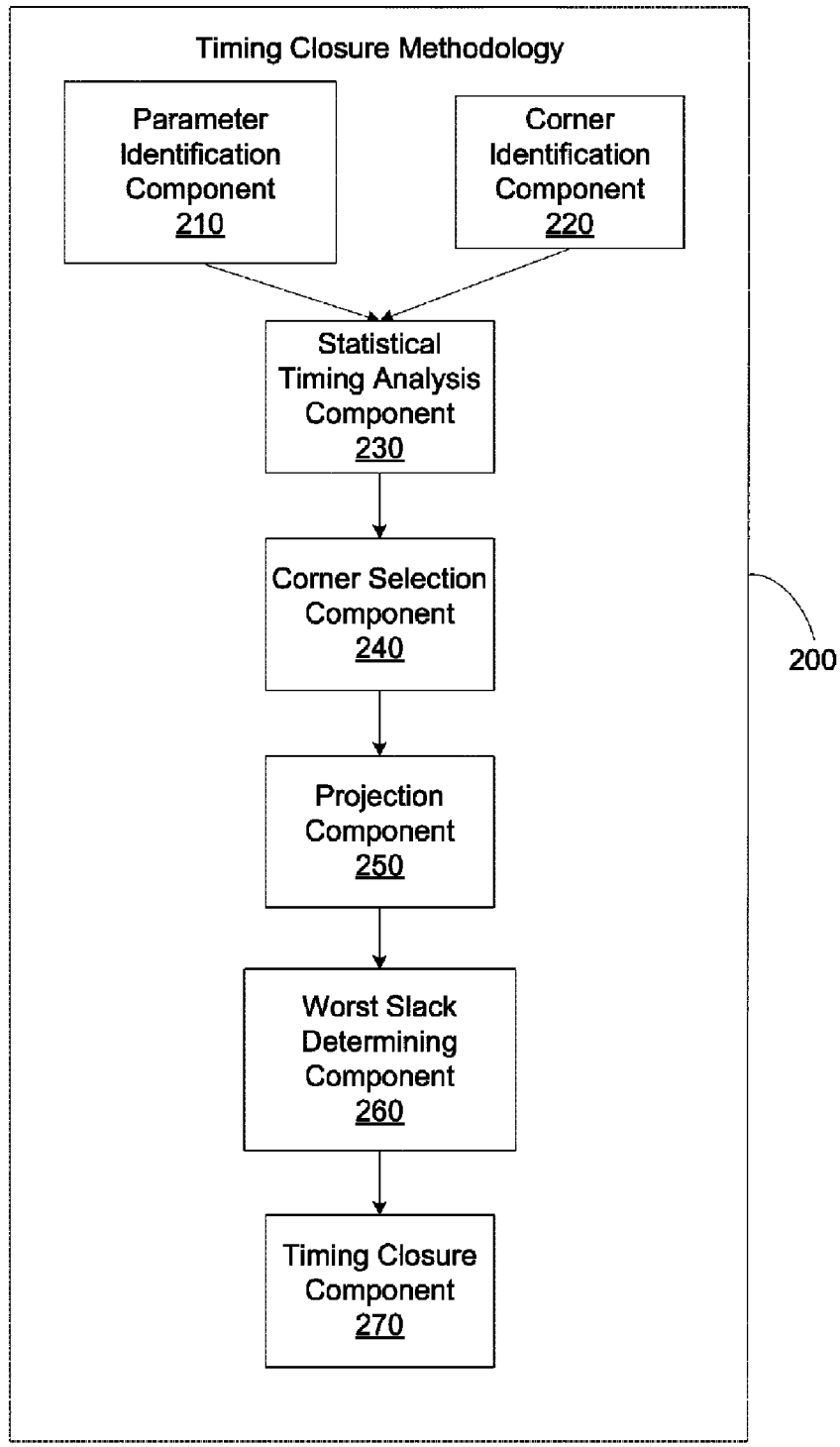
FIG. 2 shows a schematic block diagram of a timing closure methodology according to one embodiment of the invention.

FIG. 2 shows a schematic block diagram of a timing closure methodology 200 that facilitates performing a timing analysis on the full parameter space in all dimensions for an integrated circuit design, but facilitates timing closure anywhere in a subset of the full parameter space. The timing closure methodology 200 comprises a parameter identification component 210 and a corner identification component 220. The parameter identification component 210 identifies the full parameter space for performing a statistical timing analysis of all circuit paths of a digital integrated circuit design. In one embodiment, the full parameter space is defined by parameters $P_1, P_2, \ldots, P_n$, wherein $P_n \in (\min_n, \max_n)$. In one embodiment, the full parameter space covers process-voltage-temperature parameters. The corner identification component 220 identifies all corners of the parameters that model variation in a static timing analysis of the digital integrated circuit design. A non-exhaustive list of corners could include a corner of low temperature, low voltage, fast process, or a corner of high temperature, high voltage, slow process, a corner of low temperature, high voltage, nominal process, etc.

The timing closure methodology 200 further comprises a statistical timing analysis component 230 that performs the statistical timing analysis for all of the circuit paths of the digital integrated circuit design across the full parameter space. The timing closure methodology 200 also comprises a corner selection component 240 that selects a subset of k corners for each circuit path from the parameters $P_1, P_2, \ldots, P_j$. In particular, the k corners are arranged as:

$$C1(P1=p_1^1, P2=p_2^1, \ldots, Pj=p_j^1)$$

$$C2(P1=p_1^2, P2=p_2^2, \ldots, Pj=p_j^2)$$

$$Ck(P1=p_1^k, P2=p_2^k, \ldots, Pj=p_j^k)$$

The selection of the k corners will depend on requirements such as how to test the integrated circuit or how the integrated circuit is to be operated.

As shown in FIG. 1, the timing closure methodology 200 further comprises a projection component 250 that projects timing results to a deterministic value using a distribution input from the statistical timing analysis at each of the selected subset of k corners of parameters P1, P2, . . . , Pj plus the sub-space of the remaining Pj+1, Pj+2, . . . , Pn for each circuit path. Essentially, the projection component 250 uses a so-called mixed mode projection, which includes getting per-sigma variability of P1, P2, . . . , Pj, getting the collective per-sigma variability as a Root Sum of Squares (RSS) of Pj+1, Pj+2, . . . , Pn, and then projecting the timing results on to the mean value at a specified sigma value. Those skilled in the art will recognize that different projection modes such as worst case projection (i.e., finding the corner in the parameter space resulting in the worst timing value) or sigma sample projection (i.e., projecting to the 3-sigma point in the parameter space) can be used to project the timing results.

The timing closure methodology 200 also comprises a worst slack determining component 260 that determines the worst slacks from the projected timing results for the selected subset of k corners of parameters $P_1, P_2, \ldots, P_j$ plus the sub-space of the remaining $P_{j+1}, P_{j+2}, \ldots, P_n$. In one embodiment, the worst slack determining component 260 ascertains a corner from the selected subset of k corners having at least one slack value that is the worst in comparison with the slack values of all the other corners. Basically, the worst slack is determined based on the timing sign-off criteria so that if the worst slack satisfies the design requirement of the integrated circuit, the entire timing of the integrated circuit will satisfy the design requirement of the integrated circuit.

A timing closure component 270 facilitates the closing of the timing analysis of the digital integrated circuit design on each circuit path according to the corners having the worst slacks which are considered to be failing the timing sign-off criteria. In one embodiment, the timing closure component 270 fixes the timing slacks of the corners deemed to have the worst slacks.

Although not expressly shown in FIG. 2, all of the components shown in the figure are configured to interact with each other. The components that are shown as being interconnected are illustrated in that manner to convey the close interactions that exist between these components.

Figure 3:
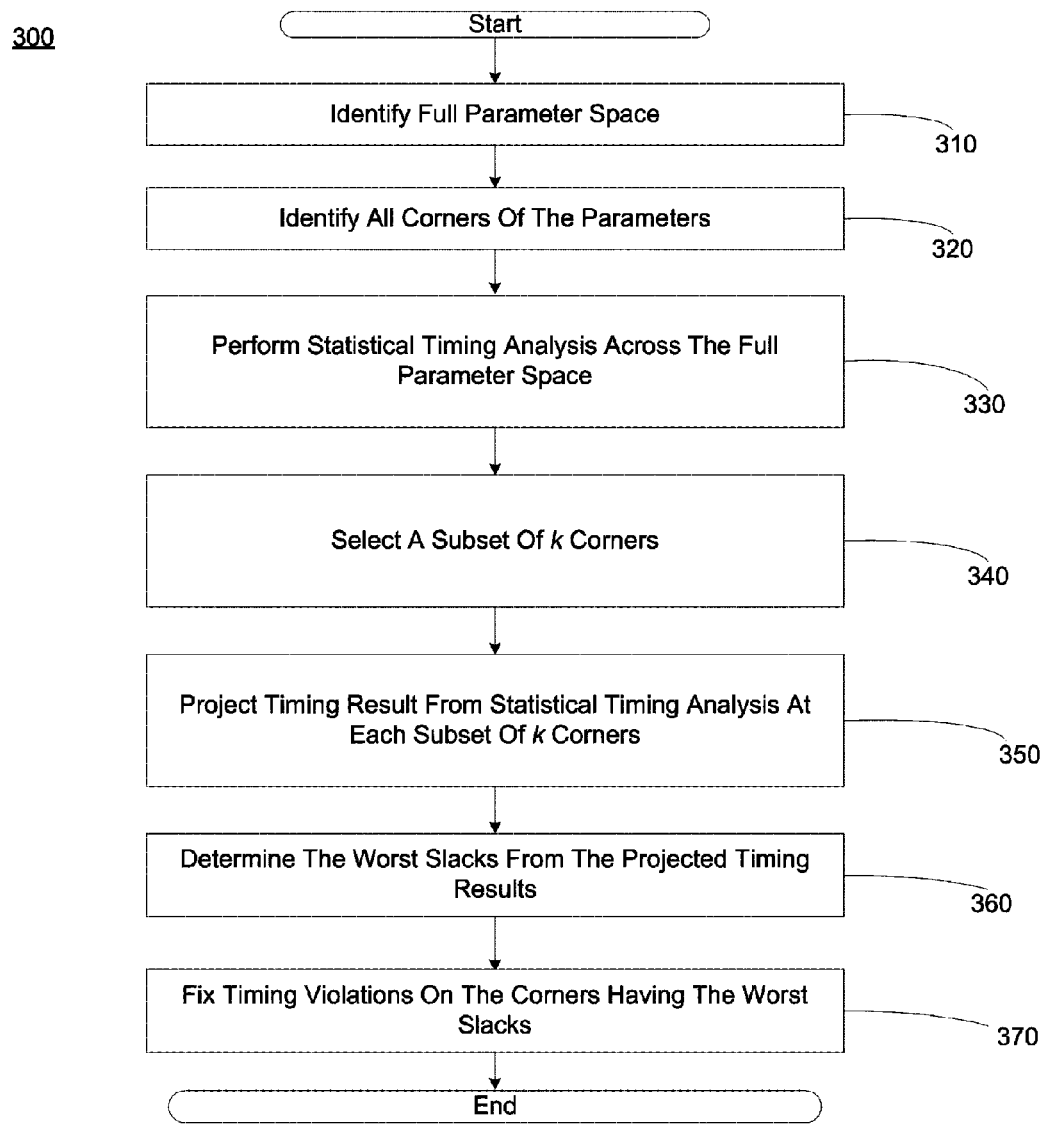
FIG. 3 shows a flow diagram describing the operations performed by the timing closure methodology depicted in FIG. 2 according to one embodiment of the invention.

FIG. 3 shows a flow diagram 300 describing the operations performed by the timing closure methodology 200 according to one embodiment of the invention. In one embodiment, operations associated with the timing closure methodology 200 are performed on a computer system. In FIG. 3, the flow diagram 300 begins at 310 where the full parameter space for performing a statistical timing analysis of all circuit paths of the digital integrated circuit design are identified. As mentioned above, in one embodiment, the full parameter space is defined by parameters $P_1, P_2, \ldots, P_n$, wherein $P_n \in (\min_n, \max_n)$. All corners of the parameters that model variation in a static timing analysis of the digital integrated circuit design are identified at 320.

At 330, a statistical timing analysis is performed for all of the circuit paths of the digital integrated circuit design across the full parameter space. The use of statistical timing analyses to analyze digital integrated circuit designs is well known to those skilled in the art. U.S. Pat. No. 7,428,716, entitled "SYSTEM AND METHOD FOR STATISTICAL TIMING ANALYSIS OF DIGITAL CIRCUITS" is an example of one type of statistical timing analysis that may be used.

After performing the statistical analysis, a subset of k corners is selected at 340 for each circuit path from the parameters $P_1, P_2, \ldots, P_j$, wherein $j \in (1, n)$. As mentioned before, in one embodiment, the selected subset of k corners are arranged as:

$$C1(P1=p_1^1, P2=p_2^1, \ldots, Pj=p_j^1)$$

$$C2(P1=p_1^2, P2=p_2^2, \ldots, Pj=p_j^2)$$

$$Ck(P1=p_1^k, P2=p_2^k, \ldots, Pj=p_j^k);$$

Timing results from the statistical timing analysis are projected to a deterministic value using a distribution input from the statistical timing analysis at each of the selected subset of k corners of parameters $P_1, P_2, \ldots, P_j$ plus the sub-space of the remaining $P_{j+1}, P_{j+2}, \ldots, P_n$ for each circuit path at 350. In one embodiment, the collective per-sigma variability of $P_{j+1}, P_{j+2}, \ldots, P_n$ is obtained using a Root Sum of Squares function.

After projecting the timing results, the worst slacks from the projected timing results are determined for the selected subset of k corners of parameters $P_1, P_2, \ldots, P_j$ plus the sub-space of the remaining $P_{j+1}, P_{j+2}, \ldots, P_n$ at 360. As mentioned above, the determining of the worst slacks comprises ascertaining a corner from the selected subset of k corners having al least one slack value that is the worst in comparison with the slack values of the other corners. After determining the worst slacks, the timing analysis of digital integrated circuit can be closed according to the corners having the worst slacks at 370. Again, this includes fixing the timing failures (i.e., violations) at the corners deemed to have the worst slacks which are considered to be failing the timing sign-off criteria.

The foregoing flow chart shows some of the processing functions associated with using the timing closure methodology 200 of FIG. 2 to perform a timing analysis for the full parameter space in all dimensions, but enable timing closure anywhere in a subset of the full parameter space. In this regard, each block represents a process act associated with performing these functions. It should also be noted that in some alternative implementations, the acts noted in the blocks may occur out of the order noted in the figure or, for example, may in fact be executed substantially concurrently or in the reverse order, depending upon the act involved. Also, one of ordinary skill in the art will recognize that additional blocks that describe the processing functions may be added.

In contrast to conventional timing analysis approaches, it is apparent that embodiments of the present invention deal with timing analysis and timing closure differently. In particular, statistical timing results from certain regions or selective corners are merged in order to reduce pessimism on timing closure while keeping full parameter space coverage and efficiency of run-time of the timing closure. Because embodiments of the present invention basically implement a VAT on any set of selective corners from a single statistical timing run, it is not necessary to fix timing failures in all corners (e.g., unlimited process-voltage-temperature points). However, it is certainly possible to identify slacks anywhere in the full parameter space if this information is needed.

One particular area where embodiments of the present invention are suitable for use is with a Selective Voltage Binning (SVB) integrated circuit technique. Because power continues to be a challenging issue for integrated circuit chip design, especially for 90 nm technology and beyond, the SVB methodology has been used as a mechanism for reducing the maximum power on an integrated circuit chip by reducing the voltage on the parts that are faster than nominal, while running the slower than nominal parts at the full voltage.

With selective voltage binning, every manufactured integrated circuit chip is tested to measure operating speed. Afterwards, the chips are sorted into bins based on whether they were fabricated at either the "slow" end or the "fast" end of a process distribution accordingly. Note that due to manufacturing variations, chips are typically fabricated either at the "slow" end or the "fast" end of a process distribution. Then, an optimal supply voltage (VDD) for operating the chips in each bin is determined and assigned to each chip (note that the chip can be designed and manufactured with programmable fuses that are adapted to record the "fast" or "slow" process information). Therefore, a fast chip from a fast chip bin may be operated at a certain reduced VDD in order to minimize static power consumption, while still meeting a given performance specification. In contrast, a slow chip from a slow chip bin is operated at the maximum achievable VDD in order to meet the performance specification. U.S. Pat. No. 7,475,366 provides an example of a method of designing and producing an integrated circuit which uses a SVB technique.

To use a SVB technique, the chip timing has to be closed at the corners defined by the bins before it is released to manufacturing. One way is to do timing closure covering entire parameter space. This causes pessimism in the performance prediction. Another way is to do perform multiple timing runs at selective corners which eventually impacts turn around time. Because embodiments of the present invention can perform a timing analysis for the full parameter space in all dimensions, but close timing anywhere in a subset of the full parameter space, it becomes an ideal solution of timing closure for SVB.

Although embodiments of the present invention have been described with respect to the timing analysis of an integrated circuit chip design, those skilled in the art will recognize that principles of this invention are suited for other applications with respect to reviewing and analyzing integrated circuit chip designs. For example, embodiments of the present invention may be used for chip power optimization. In particular, an integrated circuit chip design may be optimized for minimizing power and maximizing performance based on the different merged timing results from different regions or corners during a single timing run.

Figure 4:
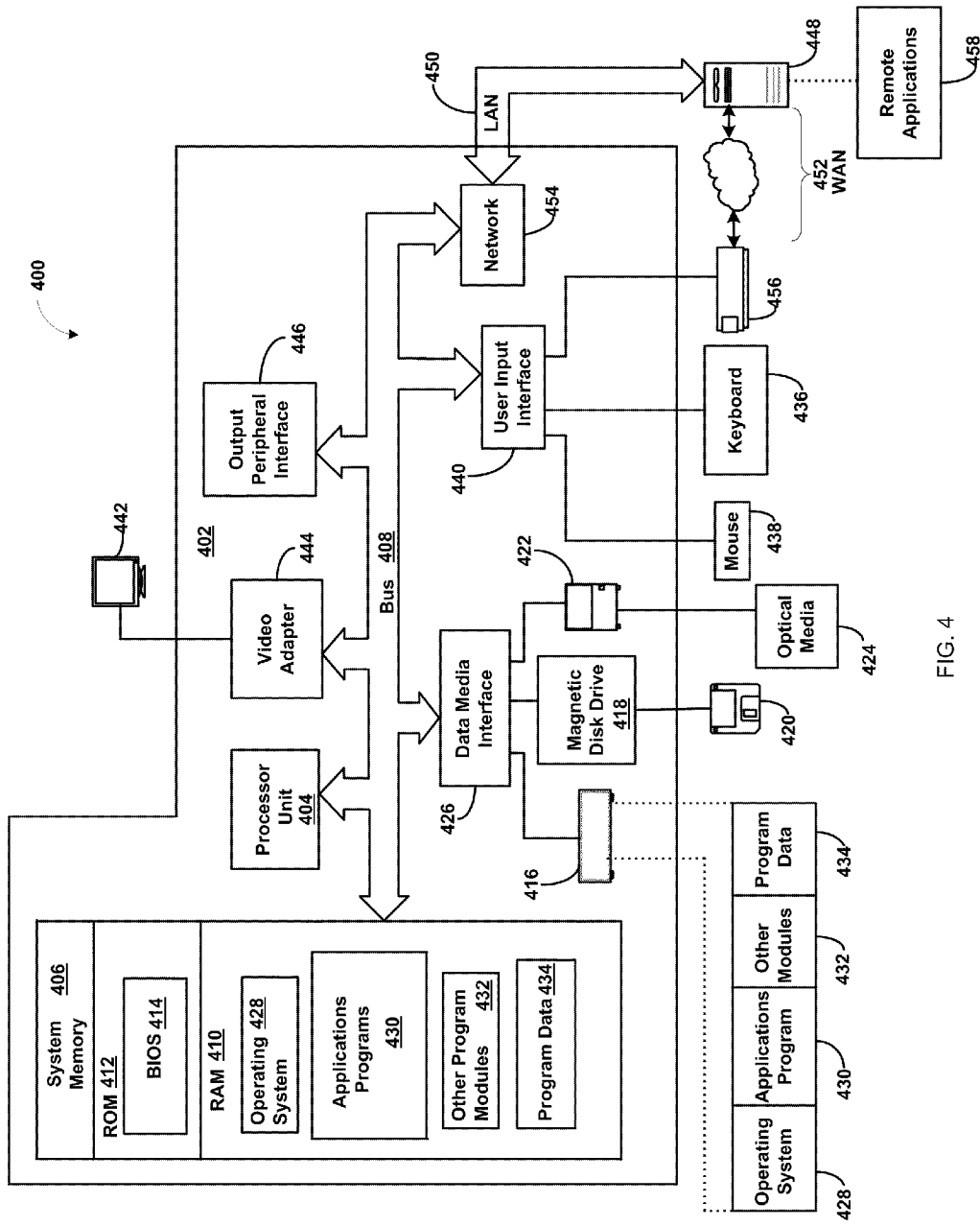
FIG. 4 shows a schematic of an illustrative computing environment in which elements of the timing closure methodology invention may operate.

FIG. 4 shows a schematic of an illustrative computing environment in which elements of the timing closure methodology 200 of this invention may operate. The exemplary computing environment 400 is only one example of a suitable computing environment and is not intended to suggest any limitation as to the scope of use or functionality of the approach described herein. Neither should the computing environment 400 be interpreted as having any dependency or requirement relating to any one or combination of components illustrated in FIG. 4.

In the computing environment 400 there is a computer 402 which is operational with numerous other general purpose or special purpose computing system environments or configurations. Examples of well known computing systems, environments, and/or configurations that may be suitable for use with an exemplary computer 402 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary computer 402 may be described in the general context of computer-executable instructions, such as program modules, being executed by a computer. Generally, program modules include routines, programs, objects, components, logic, data structures, and so on, that performs particular tasks or implements particular abstract data types. The exemplary computer 402 may be practiced in distributed computing environments where tasks are performed by remote processing devices that are linked through a communications network. In a distributed computing environment, program modules may be located in both local and remote computer storage media including memory storage devices.

As shown in FIG. 4, the computer 402 in the computing environment 400 is shown in the form of a general-purpose computing device. The components of computer 402 may include, but are not limited to, one or more processors or processing units 404, a system memory 406, and a bus 408 that couples various system components including the system memory 406 to the processor 404.

Bus 408 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 402 typically includes a variety of computer readable media. Such media may be any available media that is accessible by computer 402, and it includes both volatile and non-volatile media, removable and non-removable media.

In FIG. 4, the system memory 406 includes computer readable media in the form of volatile memory, such as random access memory (RAM) 410, and/or non-volatile memory, such as ROM 412. A BIOS 414 containing the basic routines that help to transfer information between elements within computer 402, such as during start-up, is stored in ROM 412. RAM 410 typically contains data and/or program modules that are immediately accessible to and/or presently operated on by processor 404.

Computer 402 may further include other removable/non-removable, volatile/non-volatile computer storage media. By way of example only, FIG. 4 illustrates a hard disk drive 416 for reading from and writing to a non-removable, non-volatile magnetic media (not shown and typically called a "hard drive"), a magnetic disk drive 418 for reading from and writing to a removable, non-volatile magnetic disk 420 (e.g., a "floppy disk"), and an optical disk drive 422 for reading from or writing to a removable, non-volatile optical disk 424 such as a CD-ROM, DVD-ROM or other optical media. The hard disk drive 416, magnetic disk drive 418, and optical disk drive 422 are each connected to bus 408 by one or more data media interfaces 426.

The drives and their associated computer-readable media provide nonvolatile storage of computer readable instructions, data structures, program modules, and other data for computer 402. Although the exemplary environment described herein employs a hard disk 416, a removable magnetic disk 418 and a removable optical disk 422, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on the hard disk 416, magnetic disk 420, optical disk 422, ROM 412, or RAM 410, including, by way of example, and not limitation, an operating system 428, one or more application programs 430, other program modules 432, and program data 434. Each of the operating system 428, one or more application programs 430 other program modules 432, and program data 434 or some combination thereof, may include an implementation of the timing closure methodology 200 shown in FIG. 2.

A user may enter commands and information into computer 402 through optional input devices such as a keyboard 436 and a pointing device 438 (such as a "mouse"). Other input devices (not shown) may include a microphone, joystick, game pad, satellite dish, serial port, scanner, camera, or the like. These and other input devices are connected to the processor unit 404 through a user input interface 440 that is coupled to bus 408, but may be connected by other interface and bus structures, such as a parallel port, game port, or a universal serial bus (USB).

An optional monitor 442 or other type of display device is also connected to bus 408 via an interface, such as a video adapter 444. In addition to the monitor, personal computers typically include other peripheral output devices (not shown), such as speakers and printers, which may be connected through output peripheral interface 446.

Computer 402 may operate in a networked environment using logical connections to one or more remote computers, such as a remote server/computer 448. Remote computer 448 may include many or all of the elements and features described herein relative to computer 402.

Logical connections shown in FIG. 4 are a local area network (LAN) 450 and a general wide area network (WAN) 452. Such networking environments are commonplace in offices, enterprise-wide computer networks, intranets, and the Internet. When used in a LAN networking environment, the computer 402 is connected to LAN 450 via network interface or adapter 454. When used in a WAN networking environment, the computer typically includes a modem 456 or other means for establishing communications over the WAN 452. The modem, which may be internal or external, may be connected to the system bus 408 via the user input interface 440 or other appropriate mechanism.

In a networked environment, program modules depicted relative to the personal computer 402, or portions thereof, may be stored in a remote memory storage device. By way of example, and not limitation, FIG. 4 illustrates remote application programs 458 as residing on a memory device of remote computer 448. It will be appreciated that the network connections shown and described are exemplary and other means of establishing a communications link between the computers may be used.

An implementation of an exemplary computer 402 may be stored on or transmitted across some form of computer readable media. Computer readable media can be any available media that can be accessed by a computer. By way of example, and not limitation, computer readable media may comprise computer storage media.

Computer storage media include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

It is apparent that there has been provided by this invention an approach for timing closure on multiple selective corners in a single statistical timing run. While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method, performed on a computer system, for performing timing closure of a digital integrated circuit design on multiple selective corners in a single timing that covers a full parameter space, comprising:

using the computer system to perform the following:

identifying the full parameter space for performing a statistical timing analysis of all circuit paths of the digital integrated circuit design, wherein the full parameter space is defined by parameters $P_1, P_2, \ldots, P_n$, wherein $P_n \in (\min_n, \max_n)$;

identifying all corners of the parameters that model variation in a static timing analysis of the digital integrated circuit design;

performing the statistical timing analysis for all of the circuit paths of the digital integrated circuit design across the full parameter space;

selecting a subset of k corners for each circuit path from the parameters $P_1, P_2, \ldots, P_j$, wherein $j \in (1, n)$, wherein the selected subset of k corners are arranged as:

$$C1(P1=p_1^1, P2=p_2^1, \ldots, Pj=p_j^1)$$

$$C2(P1=p_1^2, P2=p_2^2, \ldots, Pj=p_j^2)$$

$$Ck(P1=p_1^k, P2=p_2^k, \ldots, Pj=p_j^k);$$

projecting timing results to a deterministic value using a distribution input from the statistical timing analysis at each of the selected subset of k corners of parameters $P_1, P_2, \ldots, P_j$ plus the sub-space of the remaining parameters $P_{j+1}, P_{j+2}, \ldots, P_n$ for each circuit path;

determining the worst slacks from the projected timing results for the selected subset of k corners of parameters $P_1, P_2, \ldots, P_j$ plus the sub-space of the remaining parameters $P_{j+1}, P_{j+2}, \ldots, P_n$; and closing the timing of the digital integrated circuit design on each circuit path according to the corners having the worst slacks.

2. The method according to claim 1, wherein the projecting of timing results from the statistical timing analysis at each of the selected subset of k corners of parameters $P_1, P_2, \ldots, P_j$ plus the sub-space of the remaining parameters $P_{j+1}, P_{j+2}, \ldots, P_n$, comprises obtaining the collective per-sigma variability of parameters $P_{j+1}, P_{j+2}, \ldots, P_n$ through a mathematical function.

3. The method according to claim 2, wherein the mathematical function is a Root Sum of Squares function.

4. The method according to claim 1, wherein the projecting of timing results from the statistical timing analysis at each of the selected subset of k corners of parameters $P_1, P_2, \ldots, P_j$ plus the sub-space of the remaining parameters $P_{j+1}, P_{j+2}, \ldots, P_n$, comprises projecting the timing results onto a mean value at a specified sigma value.

5. The method according to claim 1, wherein the determining of the worst slacks comprises ascertaining a corner from the selected subset of k corners having at least one slack value that is the worst in comparison with the slack values of the other corners.

6. The method according to claim 1, wherein the closing of the timing analysis of the digital integrated circuit design comprises fixing the timing slacks of the corners deemed to have the worst slacks which are considered to be failing timing sign-off criteria.

7. The method according to claim 1, wherein the full parameter space covers process-voltage-temperature parameters.

8. A computer-readable medium storing computer instructions, which when executed, enables a computer system to perform timing closure of a digital integrated circuit design on multiple selective corners in a single timing run that covers a full parameter space, the computer instructions causing the computer system to perform the following:

identifying the full parameter space of for performing a statistical timing analysis of all circuit paths of the digital integrated circuit design, wherein the full parameter space is defined by parameters $P_1, P_2, \ldots, P_n$, wherein $P_n \in (\min_n, \max_n)$;

identifying all corners of the parameters that model variation in a static timing analysis of the digital integrated circuit design;

performing the statistical timing analysis for all of the circuit paths of the digital integrated circuit design across the full parameter space;

selecting a subset of k corners for each circuit path from the parameters $P_1, P_2, \ldots, P_j$, wherein $j \in (1, n)$, wherein the selected subset of k corners are arranged as:

$C1(P1=p_1^1, P2=p_2^1, \ldots, Pj=p_j^1)$ $C2(P1=p_1^2, P2=p_2^2, \ldots, Pj=p_j^2)$ $Ck(P1=p_1^k, P2=p_2^k, \ldots, Pj=p_j^k)$;

projecting timing results to a deterministic value using a distribution input from the statistical timing analysis at each of the selected subset of k corners of parameters $P_1, P_2, \ldots, P_j$ plus the sub-space of the remaining parameters $P_{j+1}, P_{j+2}, \ldots, P_n$ for each circuit path;

determining the worst slacks from the projected timing results for the selected subset of k corners of parameters $P_1, P_2, \ldots, P_j$ plus the sub-space of the remaining parameters $P_{j+1}, P_{j+2}, \ldots, P_n$; and closing the timing of the digital integrated circuit design on each circuit path according to the corners having the worst slacks.

9. The computer-readable medium according to claim 8, wherein the projecting of timing results from the statistical timing analysis at each of the selected subset of k corners of parameters $P_1, P_2, \ldots, P_j$ plus the sub-space of the remaining parameters $P_{j+1}, P_{j+2}, \ldots, P_n$, comprises obtaining the collective per-sigma variability of parameters $P_{j+1}, P_{j+2}, \ldots, P_n$ through a mathematical function.

10. The computer-readable medium according to claim 9, wherein the mathematical function is a Root Sum of Squares function.

11. The computer-readable medium according to claim 8, wherein the projecting of timing results from the statistical timing analysis at each of the selected subset of k corners of parameters $P_1, P_2, \ldots, P_j$ plus the sub-space of the remaining parameters $P_{j+1}, P_{j+2}, \ldots, P_n$, comprises projecting the timing results onto a mean value at a specified sigma value.

12. The computer-readable medium according to claim 8, wherein the determining of the worst slacks comprises ascertaining a corner from the selected subset of k corners having at least one slack value that is the worst in comparison with the slack values of the other corners.

13. The computer-readable medium according to claim 8, wherein the closing of the timing analysis of the digital integrated circuit design comprises fixing the timing slacks of the corners deemed to have the worst slacks which are considered to be failing sign-off criteria.

14. The computer-readable medium according to claim 8, wherein the full parameter space covers process-voltage-temperature parameters.

15. A computer system for performing timing closure of a digital integrated circuit design on multiple selective corners in a single timing run that covers a full parameter space, comprising:

at least one processing unit;

memory operably associated with the at least one processing unit; and a timing analysis tool storable in memory and executable by the at least one processing unit that runs a single statistical timing analysis on the full parameter space covering unlimited parameters and enables timing closure on any point associated with the unlimited parameters, the tool comprising:

a parameter identification component that identifies the full parameter space for performing a statistical timing analysis of all circuit paths of the digital integrated circuit design, wherein the full parameter space is defined by parameters $P_1, P_2, \ldots, P_n$, wherein $P_n \in (\min_n, \max_n)$;

a corner identification component that identifies all corners of the parameters that model variation in a static timing analysis of the digital integrated circuit design;

a statistical timing analysis component that performs the statistical timing analysis for all of the circuit paths of the digital integrated circuit design across the full parameter space;

a corner selection component that selects a subset of k corners for each circuit path from the parameters $P_1, P_2, \ldots, P_j$, wherein $j \in (1, n)$, wherein the selected subset of k corners are arranged as:

$C1(P1=p_1^1, P2=p_2^1, \ldots, Pj=p_j^1)$ $C2(P1=p_1^2, P2=p_2^2, \ldots, Pj=p_j^2)$ $Ck(P1=p_1^k, P2=p_2^k, \ldots, Pj=p_j^k)$;

a projection component that projects timing results to a deterministic value using a distribution input from the statistical timing analysis at each of the selected subset of k corners of parameters $P_1, P_2, \ldots, P_j$ plus the sub-space of the remaining parameters $P_{j+1}, P_{j+2}, \ldots, P_n$ for each circuit path;

a worst slack determining component that determines the worst slacks from the projected timing results for the selected subset of k corners of parameters $P_1, P_2, \ldots, P_j$ plus the sub-space of the remaining parameters $P_{j+1}, P_{j+2}, \ldots, P_n$; and a closure component that closes the timing of the digital integrated circuit design on each circuit path according to the corners having the worst slacks which are considered failing of timing sign-off criteria.

16. The computer system according to claim 15, wherein the projection component projects the timing results at a sub-space of $P_{j-1}$, $P$ $P_{j+2} \ldots$, Pn plus the sub-space of the remaining parameters $P_{j+1}, P_{j+2}, \ldots, P_n$, by obtaining the collective per-sigma variability of parameters $P_{j+1}, P_{j+2}, \ldots, P_n$ through a mathematical function.

17. The computer system according to claim 16, wherein the mathematical function is a Root Sum of Squares function.

18. The computer system according to claim 15, wherein the projection component projects the timing results onto the mean value at a specified sigma value.

19. The computer system according to claim 15, wherein the worst slack determining component ascertains a corner from the selected subset of k corners having at least one slack value that is the worst in comparison with the slack values of the other corners.

20. The computer system according to claim 15, wherein the closure component fixes the timing slacks of the corners deemed to have the worst slacks which are considered to be failing the timing sign-off criteria.

21. The computer system according to claim 15, wherein the full parameter space covers process-voltage-temperature parameters.

22. The computer system according to claim 15, wherein the corners include a corner of low temperature, low voltage, fast process; a corner of high temperature, high voltage, slow process; or a corner of low temperature, high voltage, nominal process.

* * * * *